No. 856,414. PATENTED JUNE 11, 1907.
C. A. MUDGE.
DYNAMO ELECTRIC MACHINE.
APPLICATION FILED AUG. 24, 1906.
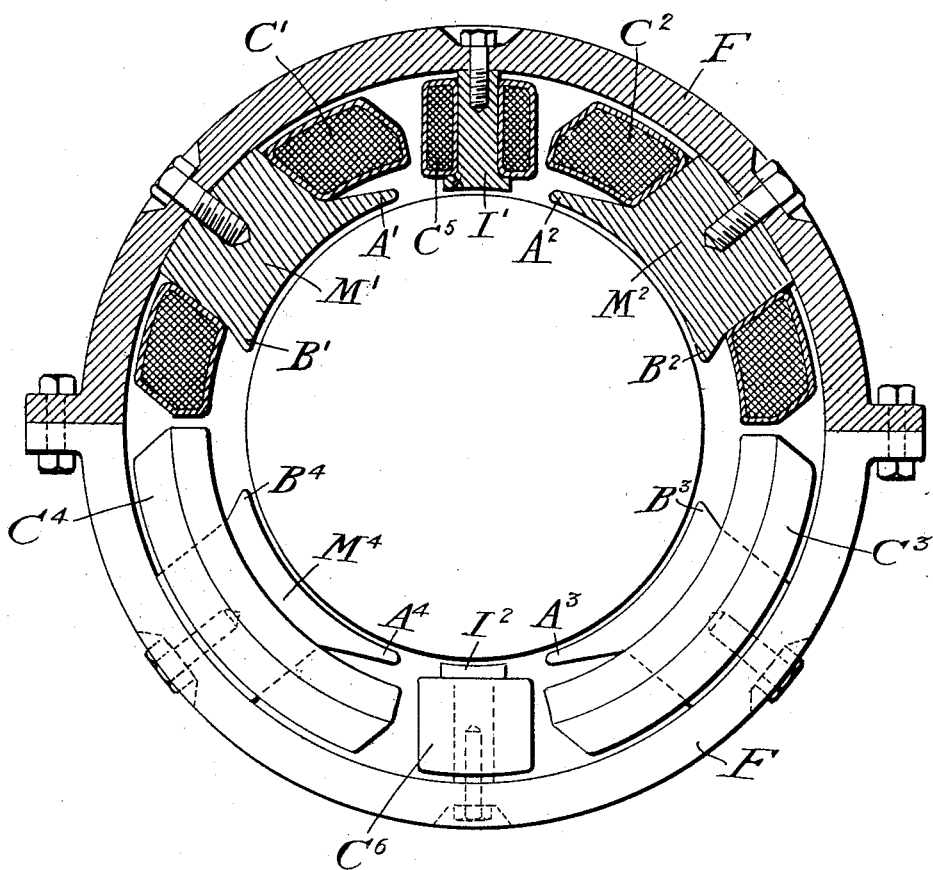

UNITED STATES PATENT OFFICE.

CHARLES A. MUDGE, OF NEW YORK, N. Y., ASSIGNOR TO ELECTRO-DYNAMIC COMPANY, OF BAYONNE, NEW JERSEY, A CORPORATION OF NEW JERSEY.

DYNAMO-ELECTRIC MACHINE.

No. 856,414.　　　　Specification of Letters Patent.　　　　Patented June 11, 1907.

Application filed August 24, 1906. Serial No. 331,822.

*To all whom it may concern:*

Be it known that I, CHARLES A. MUDGE, a citizen of the United States, residing at New York, in the county of New York and State of New York, have invented certain new and useful Improvements in Dynamo-Electric Machines; and I do hereby declare the following to be a full, clear, and exact description of the invention, such as will enable others skilled in the art to which it appertains to make and use the same.

My invention relates to improvements in dynamo electric machines of the type in which auxiliary interpoles are located in the spaces between the main poles of the machine for the purpose of securing a more perfect commutation. In machines of this character, the interpoles act to correct, to some extent, the distortion of the field due to the armature reaction, and to generate in the short circuited coil which is being commutated a current corresponding in direction to the current which is flowing in the circuit with which the short circuited coil is about to be connected by the rotation of the armature. It has been customary to locate an interpole in every space between the main poles of the machine, the interpole corresponding in polarity with the main pole following; but it has been found that it is possible to reduce the number of interpoles in dynamo electric machines in which the two portions of each armature coil appear at different points on the periphery of the armature by doubling the magnetizing effect on one portion of the coil and thereby rendering it possible to dispense with the magnetizing effect on the other portion of the coil. An example of the result of such a construction is a four pole dynamo electric machine, in which the two portions of a single coil appear on the periphery of the armature at points ninety degrees distant from one another. In such a construction, when one portion of any particular coil is in the space between two coils, the other portion of the same coil will be in the next succeeding interpolar space, and in order to secure the beneficial effect of the interpoles, it is only necessary to have an interpole in one, instead of both, of these interpolar spaces, provided the magnetizing effect of the single interpole is increased sufficiently to do the work of both. In such a machine the interpoles are two in number, and two of the interpolar spaces are left free.

The object of my invention is to take advantage of this reduction in the number of interpoles for the purpose of reducing the cost and dimensions of the dynamo electric machine and to so proportion the magnetic circuit as to be able to utilize all or a greater part of the space between the main and interpoles for the coils used to magnetize these poles.

My invention is illustrated in the accompanying drawing, which represents a four pole dynamo electric machine, of which F is the field frame, which is split into two parts and bolted together, as shown.

$M^1$, $M^2$, $M^3$ and $M^4$ represent the main poles of the machine which are energized by the current passing through the coils $C^1$, $C^2$, $C^3$ and $C^4$.

$I^1$ and $I^2$ are the interpoles, provided with the coils $C^5$ and $C^6$. It will be seen that there are only two interpoles and that the location of the armature coils is such that the coils of which one portion is beneath the interpole $I'$ have their other portions in the interpolar space between the poles $M^2$ and $M^3$, and the coils which are acted upon by the interpole $I^2$ have their other portions in the space between the main poles $M^4$ and $M^1$, and it is thus possible to dispense with interpoles between the main poles $M^2$ and $M^3$, and $M^4$ and $M^1$. It will be seen furthermore that the field frame is split in the interpolar spaces in which the interpoles are not located, thus giving a compact and symmetrical construction.

In order that all of the spaces between the cores of the various magnetic poles may be fully utilized the main poles are formed with long and short tips A and B respectively, the long tips A always being turned toward the interpoles. By this arrangement of the main poles, I am able to space their pole faces symmetrically around the periphery of the armature, while their energizing coils and cores are unsymmetrically spaced, thus allowing the coils of the interpoles to be so placed that they do not interfere with the main pole coils, and all the space between the pole cores may be utilized for windings if desired. In other words, the spaces between the main polar faces are all equal, while the spaces between the main polar cores are unequal and the interpoles are located in the larger inter-core spaces. This cannot be attained in the usual form of magnetic circuit in which the poles have symmetrical tips and in the case of some types of motors, such as automobile and railway, where the outside dimensions of the motors must be kept as small as possible, this arrangement of field poles and coils will allow not only a considerable saving of material, but a valuable saving in space.

The figure shown herewith, represents a four pole machine with two interpoles, but it is evident that this construction may be utilized in machines with more or less than four main poles and I do not wish to limit myself to this particular number of poles or to the specific proportions shown in this figure as variations may be made from the construction shown herewith, and still come within the scope of the claims attached hereto. Another advantage arising from the construction represented is that the standard method of horizontally splitting the frames of railway motors may be retained and still the advantages of using the interpoles obtained.

The illustration shows the frame as split horizontally through the inter-polar spaces which do not contain inter-poles. It is evident, however, that the whole frame structure might be turned around, so that the split could be made at any desirable angle with the horizontal and also that the frame could be made without splitting, but in one continuous piece. I do not wish to limit myself to using either a solid or a split frame, as both frames may be used to advantage as the case requires, but when the split frame is used, I prefer to make the split through the interpolar spaces, which do not contain interpoles.

What I claim is:

1. A dynamo electric machine having main and interpoles, the main pole faces being symmetrically spaced about the periphery of the armature while their cores are unsymmetrically spaced, thereby allowing space for the coils of the interpoles.

2. A dynamo electric machine having spaces of different extent between the cores of the main field poles, and an interpole located in the larger inter-core space.

3. A dynamo electric machine having a plurality of main poles with unsymmetrically spaced cores, half as many interpoles located in alternate intercore spaces, the intercore spaces containing interpoles being larger than the spaces which do not contain interpoles, and the polar tips of the main poles being extended in the direction of the adjacent interpole to secure a symmetrical arrangement of the polar faces, substantially as described.

4. A dynamo electric machine having a plurality of main poles and half as many interpoles, the main pole faces being symmetrically spaced about the armature, and the inter-core spaces containing interpoles being larger than the inter-core spaces which do not contain interpoles.

5. A dynamo electric machine having a plurality of main poles and half as many interpoles located in alternate spaces between the main poles, the field frame being split through the interpolar spaces which do not contain interpoles, the windings of the main poles being unsymmetrically arranged so that these windings and the windings of the inter-poles substantially fill the frame, substantially as described.

6. A dynamo electric machine having a plurality of main poles with unsymmetrically spaced cores, half as many interpoles located in alternate intercore spaces, and the field frame being split through the interpolar spaces which do not contain interpoles, the intercore spaces containing interpoles being larger than the spaces which do not contain interpoles, and the polar tips of the main poles being extended in the direction of the adjacent interpole to secure a symmetrical arrangement of the polar faces, substantially as described.

In testimony whereof I affix my signature, in presence of two witnesses.

CHARLES A. MUDGE.

Witnesses:
H. H. APPLEGATE,
WILLIAM H. DAVIS.

DISCLAIMER.

856,414.—*Charles A. Mudge*, New York, N. Y. DYNAMO-ELECTRIC MACHINE.

Patent dated June 11, 1907. Disclaimer filed April 13, 1912, by the assignee, *Electro-Dynamic Company*.

Enters this disclaimer with respect to said Letters Patent No. 856,414—

"To that part of the claims in said Letters Patent which is in the following words, to wit:

"2. A dynamo electric machine having spaces of different extent between the cores of the main field poles, and an interpole located in the larger inter-core space.

[OFFICIAL GAZETTE, *April 23, 1912.*]